United States Patent [19]

Swanson

[11] Patent Number: 4,997,229
[45] Date of Patent: Mar. 5, 1991

[54] APPARATUS FOR COVERING SELECTED PORTIONS OF A VEHICLE BODY

[76] Inventor: Thomas E. Swanson, 4467 Clay St., Boulder, Colo. 80301

[21] Appl. No.: 410,297

[22] Filed: Sep. 21, 1989

[51] Int. Cl.$^5$ .............................................. B60R 27/00
[52] U.S. Cl. .................................... 296/136; 280/770; 150/166
[58] Field of Search ........................ 296/136; 150/166; 280/770; 52/DIG. 14

[56] References Cited

U.S. PATENT DOCUMENTS

| | | | |
|---|---|---|---|
| 1,015,474 | 1/1912 | Bullock | 180/69.25 X |
| 1,528,712 | 3/1925 | Ward | 150/166 X |
| 2,048,461 | 7/1936 | Mosgoffian | 150/166 |
| 4,219,218 | 8/1980 | Waldon | 280/770 |
| 4,376,546 | 3/1983 | Guccione et al. | 296/95.1 X |
| 4,795,207 | 1/1989 | Clarke | 296/136 |

OTHER PUBLICATIONS

*Covercraft* Brochure, 11/1986.
*Kar King Manufacturing, Inc.*, Catalogue, 1985–1986.
*Colgan Custom Manufacturing* Promotional Brochure, no date.
"Perfect Fit", Car Bra Promotional Brochure, no date.
"American Stitchco Skin-Tights", Promotional Brochure, no date.
The *Kayline Manufacturing* Catalogue, 1986 copyrighted.
"Kayline Accessories for Suzuki Samurai", Promotional Brochure, Copyrigted 1987.
The *Bestop* Owners Manual Pertaining to Model No. 55247-LeBra, no date.
"Carmadillo Front-End Auto Mask", Promotional Brochure by the Farber Company, no date.

*Primary Examiner*—Margaret A. Focarino
*Assistant Examiner*—Andrew C. Pike
*Attorney, Agent, or Firm*—Harold A. Burdick

[57] ABSTRACT

An apparatus for covering selected portions of a vehicle body is disclosed having a plurality of cover sections with each section being configured to cover different selected portions of the vehicle body, for example portions of the front fenders, bumper area, engine compartment hood, and headlamp housings of an automobile. Some cover sections are provided with resilient securing and conforming cords engageable with the covers, with the cords being adjustable in overall length to provide for the continued ability to secure and conform the covers to the vehicle body over time. The cover sections are quickly and simply securable to the selected portions of the vehicle body utilizing a minimum of direct attachments thereto.

23 Claims, 3 Drawing Sheets

Fig_1

Fig_2

Fig_9

Fig_3

Fig_10

Fig_5

Fig_4

APPARATUS FOR COVERING SELECTED PORTIONS OF A VEHICLE BODY

FIELD OF THE INVENTION

This invention relates to covers for vehicles and, more particularly, relates to covering apparatus for selected portions of a vehicle body.

BACKGROUND OF THE INVENTION

Covering units adapted for protective and/or decorative covering of selected parts of a motor vehicle body have been heretofore utilized, and have included covers for portions of the front fenders, hood, bumper area, including grill work thereat, and/or headlamps housings (such covers often being referred to as "masks" or "bras").

For example, such covers have included one-piece covers for covering some or all of the above-described areas (for example, products manufactured by Covercraft Industries, Inc., Kar King Manufacturing, Inc., Colgan Custom Manufacturing, and Perfect Fit). Such covers, while having met with at least some acceptance, have often proven to be difficult and time consuming to install, have required substantial removal of parts of the cover to gain access to vehicle compartments such as the engine compartment, and/or have not always conformed well to vehicle body contours, particularly over time as the cover material and/or connectors expand, contract, and/or are stretched or otherwise distorted due to long term use, repeated removal and reattachment thereof, and/or exposure to moisture, wind, heat, cold, and other recurring natural conditions experienced during use of the cover.

By way of further example, two-piece covers, or masks, have been heretofore utilized for covering portions of the front fenders and bumper area and, separately, the engine compartment hood area of an automobile (for example, products manufactured by American Stitchco., Inc., Kayline Manufacturing, Bestop, Inc., and the Farber Company). While such two-piece units have in general not required substantial removal of the mask in order to gain access to the engine compartment, many of the other difficulties encountered with one-piece covers have not been satisfactorily addressed. For example, the use of multiple connections, including a plurality of bendable metallic tabs sewn in the cover for attachment thereof at each wheel well structure and/or connectors between the cover and front bumper area, for maintaining the cover portions on the vehicle, contributes to a more difficult and time consuming installation procedure. Means for improved and longer term cover conformity to vehicle body contours and security of the cover thereon while the vehicle is in motion (i.e., reduction of cover flapping or flutter and the like) are further improvements which could still be utilized.

Such covers have also included covers for vehicle headlamps housings, including those which are movable between stored and operative positions, (for example, products manufactured by Bestop, Inc., Covercraft Industries, Kar King Manufacturing, Inc., Colgan Custom Manufacturing, Perfect Fit, and American Stitchco, Inc.). Such headlamps housing covers heretofore known, however, have often proven difficult to install, have been subject to flapping or fluttering when the vehicle is in motion, and/or have required manual manipulation and securement to accommodate movement of such movable housings between positions.

Thus, while protective and/or decorative covers for motor vehicles have been heretofore utilized, improvements in such covers could nevertheless still be utilized.

SUMMARY OF THE INVENTION

This invention provides an apparatus for covering selected portions of the exterior surface of a vehicle body, for example portions of the engine compartment hood, front fenders, and front bumper area, which apparatus is quickly and easily installable on, or removable from, the vehicle, readily adjustable to accommodate for any distortion of the shape or dimensions of the flexible cover which may occur over time due to usage, repeated application and removal thereof, and/or exposure to natural elements, and which securely conforms to contours of the covered portions of the vehicle body.

The apparatus includes a plurality of cover sections, or units, utilizable individually and/or in conjunction with one another, each section being configured to cover different selected portions of the vehicle body to accommodate desired relative movement between such portions.

A first cover section includes a cover configured for covering a selected portion of the exterior surface of a vehicle body which includes a contoured area and a lower edge both extending between first and second lateral edges, for example the front fenders and bumper area of the vehicle, with the cover including engaging structure having a first section positioned along the contoured area and a second section positioned adjacent to the lower edge of the selected portion of the vehicle when the cover is positioned adjacent to the selected portion. The engaging structure may include, for example, straps, webbing, and/or a fabric sleeve, and is configured to engage a member for securing and conforming the cover on the selected portion of the vehicle so that the cover maintains conformity with the first contoured area and edges thereof when installed and while the vehicle is in use.

Another cover section is provided to cover a part of the selected portion of the vehicle which is movable relative to other parts, for example a compartment hood such as the engine compartment hood. Such cover section includes at least first and second resilient tensioning members positioned between first and second lateral edges of the movable part, the first tensioning member being attachable to the first part and at least partly located adjacent to a forward edge thereof when the cover section is positioned on the first part. The second tensioning member, which may include a plurality of sections, is releasably engagable at retainers attached to the outer surface of the first cover section adjacent to first and second lateral edges of the movable part.

A third cover section, or unit, for covering movable headlamps housings which may be associated with the vehicle body is provided and includes a cover for covering the upper surface of the housing. The cover includes a clip attached to one edge thereof which is receivable over a lip formed by the upper surface structure of the headlamps housing to thereby provide for ease of installation of such cover section on the housing.

When thus configured, the covering apparatus of this invention is easily and quickly installable and removable from the vehicle, the covering apparatus requiring a minimum of direct attachment points to the vehicle body for secure maintenance and conformity thereof on the vehicle. The first and second resilient tensioning members and the securing and conforming member are preferably made of elastic, or resilient, cord material, and may be readily made adjustable, for example by knotting the cord or the like, to control the overall length thereof and thus provide for security and stability of the apparatus on the vehicle and to accommodate for distortion of shape and/or dimensions of the covers which may occur over time due to usage, repeated application and removal thereof, and/or exposure to natural elements so that close conformity to the contours of the vehicle body may be maintained.

It is therefore an object of this invention to provide an improved apparatus for covering selected portions of the exterior surface of a vehicle body which is easily and quickly installable and removable.

It is another object of this invention to provide an apparatus for covering selected portions of the exterior surface of a vehicle body, for example portions of the engine compartment hood, front fenders, and front bumper area thereof, which apparatus is quickly and easily installable on, and removable from, the vehicle, readily adjustable to accommodate for any distortion of the shape or dimensions of the flexible cover which may occur due to usage, repeated application or removal thereof, and/or exposure to natural elements over time, and which closely conforms to contours of the covered portion of the vehicle body when installed and while the vehicle is in use.

It is another object of this invention to provide a covering unit for covering a selected portion of an exterior surface of a vehicle body having at least a first contoured area and a lower edge extending between first and second lateral edges which includes a cover having a first engaging section positioned along the first contoured area and a second engaging section positioned adjacent to the lower edge of the selected portion of a vehicle body when the cover means is positioned adjacent to the selected portion, the engaging sections being configured to engage a securing and conforming member for securing the cover adjacent to the selected portion of the exterior surface of the vehicle body and maintaining the cover in conformity with the contoured area and edges thereof.

It is another object of this invention to provide a cover unit for covering selected portions of the exterior surface of a vehicle body which is maintainable on the selected portions by a minimum of direct attachments to the vehicle body.

It is still another object of this invention to provide a covering apparatus having first and second cover sections with the first cover section being at least in part maintained on the vehicle body by releasable engagement of at least a first resilient tensioning member associated therewith with retainers attached to the other cover section.

It is yet another object of this invention to provide a covering unit for covering a selected portion of a movable headlamps housing located in a vehicle body which includes a clip attached to one edge of a cover thereof, the clip being receivable over a lip on the upper surface structure of the headlamps housing to thereby provide for ease of installation of the covering unit.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as to come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
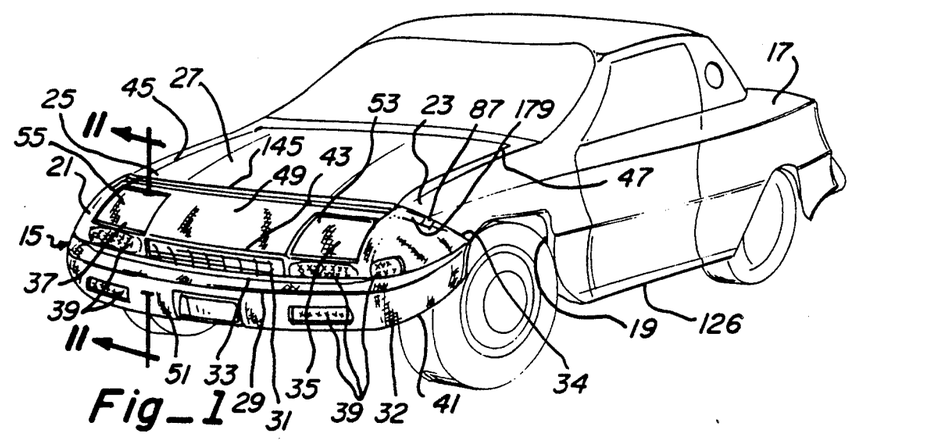
FIG. 1 is a perspective view of a vehicle having the covering apparatus of this invention installed thereon.

Covering apparatus 15 is illustrated in FIG. 1 as installed on selected front portions of vehicle body 17. Vehicle body 17 includes wheel well defining structures 19 and 21 (shown in FIGS. 1, 4, and 11), front fenders 23 and 25, engine compartment closure, or hood, 27, front bumper area 29, including grill 31 and bumper 32, contoured area 33 being defined between the forwardmost surface of front
bumper 32 and grill 31 and fenders 23 and 25 and extending between wheel well structures 19 and 21 at lateral edges 34 and 34' (shown in FIGS. 1 and 11) of the selected portion to be covered. Fixtures, such as movable headlamps housings 35 and 37 (shown in the stored position) and a plurality of running lamps 39, are provided. The lower edge of bumper 32 defines, in part, lower edge 41 of vehicle body 17. Hood 27 includes forward edge 43 and lateral edges 45 and 47.

Covering apparatus 15 includes cover section 49 for covering a selected portion of hood 27, cover section 51 for covering a selected portion of fenders 23 and 25 and front bumper area 29 (including bumper 32, contoured area 33 and, if so desired, grill 31), and cove sections 53 and 55 for covering the upper surface structure of movable headlamps housings 35 and 37, respectively.

Figure 2:
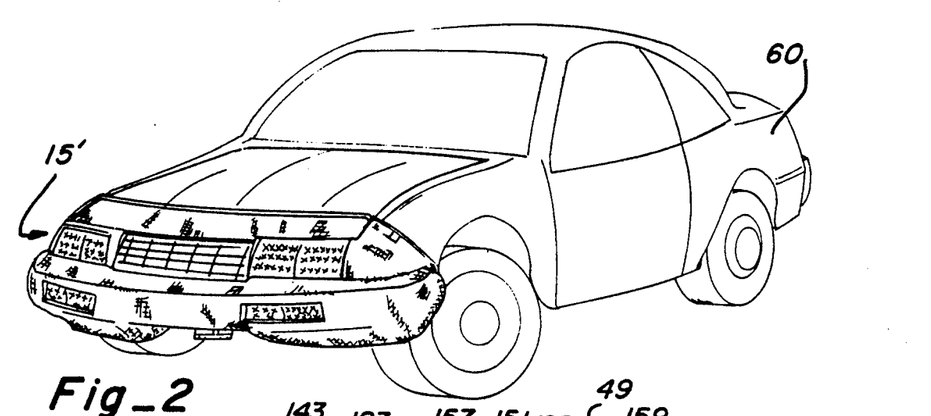
FIG. 2 is a perspective view of a second vehicle having the apparatus of this invention installed thereon and illustrating a differently configured cover portion thereof to accommodate the different body style of the second vehicle.

FIG. 2 illustrates covering apparatus 15' mounted to vehicle body 60, vehicle body 60 having a different configuration than vehicle body 17, and the covering apparatus including differently configured covers to accommodate the configuration of the selected portions of vehicle body 60, for example providing differently positioned openings in the covers for running lamps, immovable headlamps, and/or a different configuration of the engine compartment hood. While, as the description proceeds, reference will be made to a covering apparatus as configured in FIG. 1, it should be realized that the apparatus may be readily manufactured to conform to a wide variety of vehicle body designs.

Figures 3, 4, 5, 10:
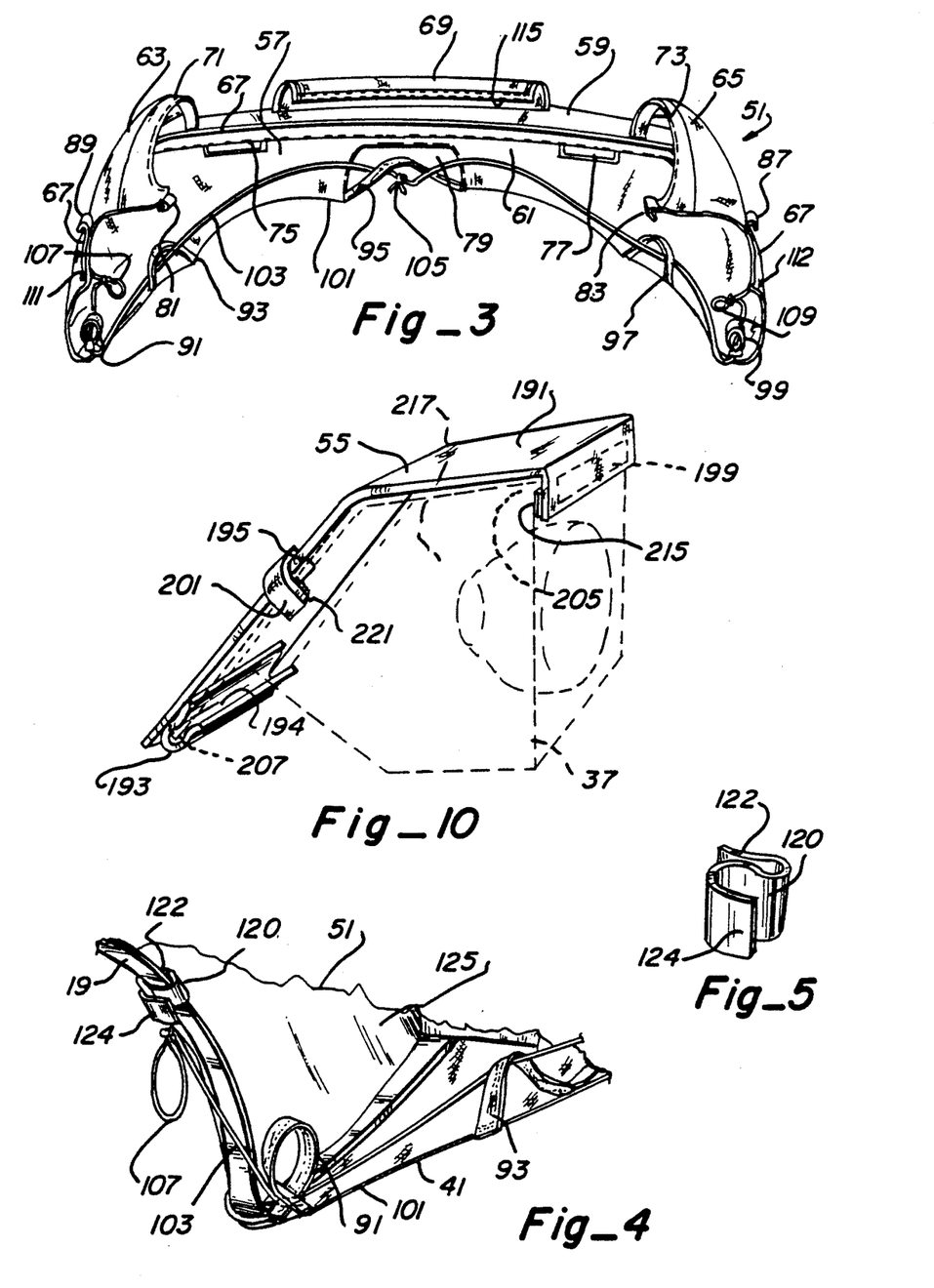
FIG. 3 is a perspective view of the part of the covering apparatus for covering selected portions of the front fenders and bumper area of a vehicle.
FIG. 4 is an enlarged partial perspective view of the part of the apparatus shown in FIG. 3 illustrating mounting thereof adjacent to a wheel well defining structure of the vehicle body.
FIG. 5 is a perspective view of the retaining clip mountable to the vehicle body shown in FIG. 4.
FIG. 10 is a perspective view of a movable headlamps housing cover unit of the apparatus shown in FIG. 1.

Turning now to FIG. 3, cover section 51 as illustrated in FIG. 1 is shown in more detail (the cover being illustrated at its inwardly facing surface). Cover section 51 includes flexible cover 57 having a plurality of sections stitched together including strip 59, main body 61, fender covers 63 and 65, fabric sleeve 67 (the rear side only of which is shown in FIG. 3 but which is further illustrated in FIG. 11), and fabric screen 69, a porous fabric for passage therethrough of air to grill 31 of the vehicle. A plurality of open areas in the cover (71, 73, 75, 77, and 79) are provided for various running lights, license plates, and the like normally present on the vehicle body (it being understood that placement of such openings, together with the overall configuration of the cover, may be adjusted to fit various vehicle models).

Figure 9:
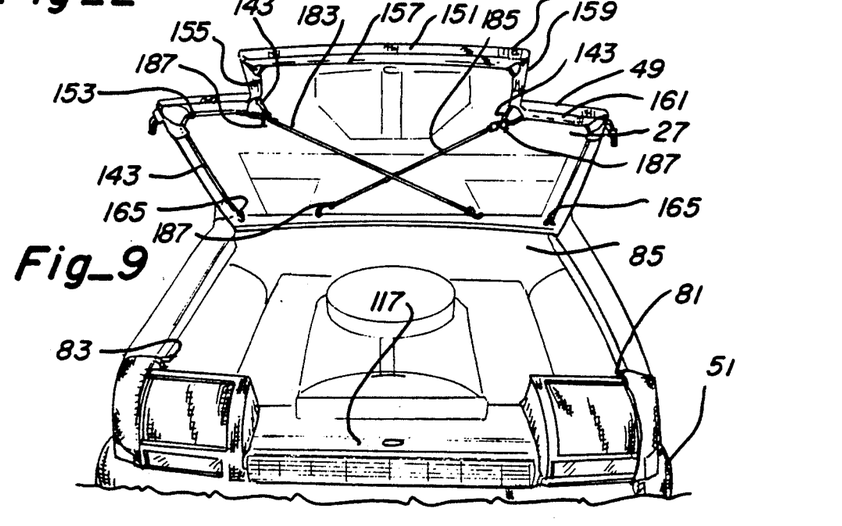
FIG. 9 is a perspective view of the apparatus particularly illustrating mounting thereof adjacent to the engine compartment hood of the vehicle.

Fender clips, or hooks, 81 and 83 are provided for fastening the cover on the inward framework of engine compartment opening 85 (as illustrated in FIG. 9). Retaining clips 87 and 89 are provided adjacent the fender cover sections 65 and 63, respectively, for in part securing cover 49, as more fully set forth hereinafter.

A plurality of webbings, or straps, 91, 93, 95, 97 and 99 are sewn along lower edge 101 of flexible cover 57, for, together with fabric sleeve 67, engagement therethrough of resilient cord 103 for securing and conforming cover section 51 on the vehicle. Resilient cord 103 is formed as a loop by knotting at knot 105 the ends of cord 103, and loops 107 and 109 are knotted into the cord adjacent opposite fender covers 63 and 65, respectively, to provide for ease of manipulation of the cord in fastening the cord as hereinafter set forth. Cord 103 passes through grommets 111 and 112 from the inner face to the outer face of the cover before receipt of the cord into fabric sleeve 67. As may be appreciated, the tautness of the cover on the fenders and bumper area of a vehicle may be adjusted by shortening or lengthening the cord by repositioning knot 105.

Fabric screen 69 includes a Velcro brand fastening fabric-type material 115 at the upper edge thereof to maintain the fabric screen on forward engine compartment surface 117 (as shown in FIG. 9, where a mating Velcro strip is applied, for example using water resistant adhesives, or the like).

Turning now to FIG. 4, cover section 51 is maintained on the fenders and front bumper area utilizing retaining clips 120, one of which is mountable to each wheel well defining structure 19 and 21 (wheel well structure 19 being illustrated herein). As shown in FIG. 5, clip 120 is an s-shaped clip including fender clip section 122 and cord receiving section 124, the sections being configured to receive and grip wheel well defining structure 19 or 21, and cord 103, respectively. Clip section 122 is configured to snuggly grip defining structure 19 or 22 formed of material as thin as thirty thousandths of an inch or as wide as 150 thousandths of an inch, and may include gripping structures, or teeth, formed therein to further assure securement of the clip at the wheel well defining structure. The clips, made of plastic, sheet metal, or, preferably, spring steel, are mountable without the requirement for use of any tool. As may be appreciated, when loop 107 is grasped by a use thus to position cord 103 in clip 120 (the same operation occurring at the other fender), cover section 51 will be maintained at the bumper and fender area (and, in cooperation with clips 81 and 83 shown in FIGS. 3 and 9, on the selected area of the vehicle) by biasing webbings 91 through 99 around lower edge 41 of the body of the vehicle and/or bumper and toward the area adjacent to inner surface 125 of the vehicle body and to undercarriage 126 thereof. At the same time, fabric sleeve 67 will be drawn tautly toward grill area 31 thus bringing cover section 51 into conformity with contoured area 33 and lower edge 41 of the selected portions to be covered thereby. In this manner a minimum of direct attachments to the vehicle body is required (only retaining clip 120 being required at each wheel well structure to maintain the cover thereat).

Figures 6, 7:
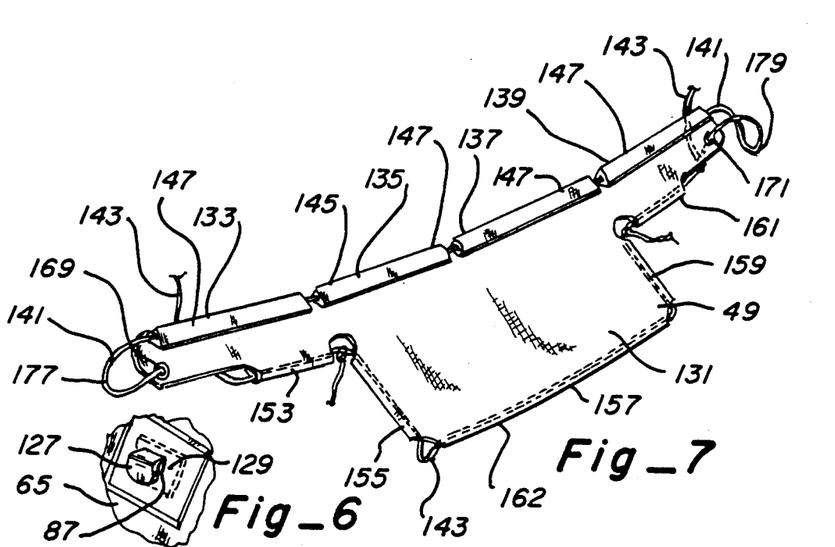
FIG. 6 is an enlarged perspective view of one of the retainer clips attached to the part of the apparatus shown in FIG. 3 at the outer surface
thereof adjacent to each of the fenders.
FIG. 7 is a perspective view of a second part of the covering apparatus utilized for covering a selected portion of a movable compartment hood of the vehicle.

FIG. 6 provides a detailed view of retaining clips 87 and 89 including clip section 127 and base mount 129. The clips are constructed of plastic material, the material being soft enough to be stitched onto the fabric cover. The fabric covers shown herein may be made of, for example, fleece-backed vinyl material or other materials utilized for such covers as are known in the art.

Figures 8, 11:
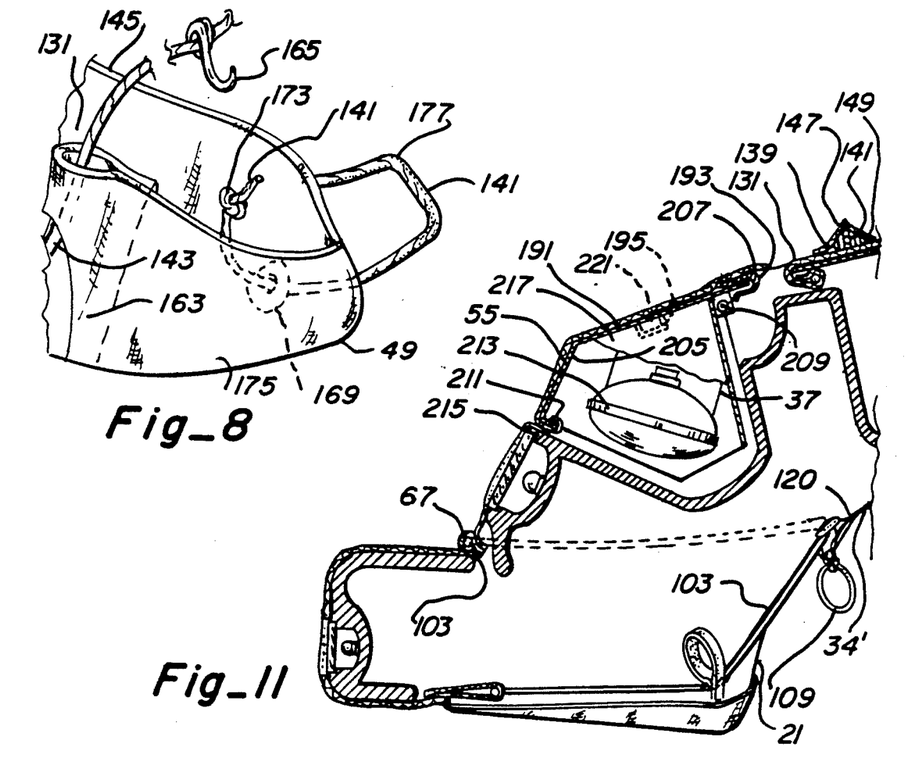
FIG. 8 is an enlarged partial perspective view of the part of the apparatus shown in FIG. 7.
FIG. 11 is a sectional view of the apparatus taken through section lines 11—11 of FIG. 1.

Turning now to FIGS. 7 through 9, cover section 49 is illustrated and includes main cover body 131, wind deflector segments 133, 135, 137, and 139 (provided in segments for ease of folding of the cover and close fit to different hood styles and designs), and resilient tensioning cords 141 and 143. Deflector segments 133 through 139 are sewn at rear portion 145 of cover 131, and include a plurality of fabric sleeves 147 having relatively rigid plastic members 149 (as illustrated in FIG. 11) maintained therein, with tensioning cord 141 passing through the relatively rigid members 149. It should be realized that a plurality of cords 141 could be utilized by knotting one end of each one thereof to disallow passage of such end through a selected one of members 149

Tensioning cord 143 is maintained in pockets 153, 155, 157, 159 and 161 stitched in a forward and lateral edge 162 of cover 131. When thus configured, as shown in FIGS. 1 and 7, cover section 131 extends between, and adjacent to the ends of cord 141 slightly beyond, lateral edges 45 and 47 of hood 27. Tensioning cord 141 maintains rear edge 145 firmly in contact with hood 27 in cooperation with deflector members 133 through 139 which also extend substantially the entire distance between lateral edges 45 and 47.

As shown in FIG. 8, illustrating one end of cover 131 (it being understood that both ends of the cover are similarly configured), tensioning cord 143 passes through fabric sleeves 163 at each end of cover 131 and has hooks 165 (see FIG. 9) knotted at each end of the cord. Cord 141, at each end thereof, is threaded through grommets 169 and 171 sewn into the fabric and knotted therebehind at knots 173. Pockets 175 are stitched into cover 131 at each end thereof to house knots 173 to thus protect the surface finish of the outer body. By repositioning knots 173, the tautness of the cover may be maintained over time as the fabric and/or the resilient cord stretches due to exposure to the weather and/or repeated usages. When thus applied, loops 177 and 179 are formed at opposite ends of cord 141, the loops being engagable in clips 89 and 87, respectively, of cover section 51 (as shown in FIG. 1). Alternately, where cover section 49 is used on a vehicle without cover section 51 or where a vehicle has existing appropriate structure, loops 177 and 179 may be engaged by existing vehicle structure, for example the hood latches of a four wheel drive type vehicle (such as the CJ model produced by the AMC-Jeep Company or the like). As may be appreciated, utilization of the described loop and clip arrangement offers significant advantages over now known fabric connectors, such as the trademarked product Velcro, heretofore utilized, by providing a connecting arrangement between covers which has a longer useful life, has easily replaceable parts where such parts are subject to wear and degradation due to exposure and use, and which provides greater cover stability adjacent to the interconnection (i.e., thereby providing a sleeker line and less flutter and flap of the cover when the vehicle is in use) over the life of the cover.

As shown in FIG. 9, additional tensioning members 183 and 185 may be provided (for example resilient cords) having hooks 187 at each end thereof to thus, with cord 143, draw forward the forward and lateral edge 163 over and into conformity with front edge 43 of hood 27 when hooks 187 and 165 are secured to a convenient hood 27 structural member. Again, as may be appreciated, by shortening cords 143, and 183 and 185 by repositioning hooks 165 and 187 respectively, thereon, cover section 49 may be brought into close conformity with the hood, and maintained in conformity therewith over time.

Turning now to FIGS. 10 and 11, cover sections 53 and 55 are illustrated (cover section 55 being utilized for ease of illustration, but both cover sections being substantially identical). Cover sections 53 and 55 include cover material portion 191, plastic clip 193 (having elongated trough 194 defined thereby) stitched thereto, Velcro brand material fastening strips 195, 197, and 199 being provided at the sides and front edge of cover 191 (strip 197 being positioned opposite cover 191 from strip 195, though not shown in FIG. 10). Velcro strips 195 and 197 are sewn to flaps 201 and 203 (flap 203 not being illustrated but being positioned opposite cover 191 from flap 201) which flaps are in turn stitched to cover 191.

Rotatable headlamps housings 35 and 37 (rotatable headlamps housing 37 being shown herein in broken line illustration) include upper surface structure 205 having lip 207 at the rear edge thereof adjacent to hinge 209 utilized to pivot the lamp between stored and operative positions. Front wall structure 211, adjacent to lamp 213, has Velcro strip 215 attached thereto, for example by gluing, and side wall structures 217 and 219 have Velcro strips 221 and 223, respectively, attached thereto (only strip 221 and wall 217 being shown).

Clip 193 is easily maneuverable over lip 207, lip 207 being receivable in trough 194 of clip 193, when the housings are in the stored position of FIG. 1 with upper surface structures 205 being substantially coplanar with adjacent portions of the exterior surface of vehicle body 17. The Velcro fasteners are engagable thereafter when the housings are moved to their operative position, thus providing for ease of installation of such covers not heretofore realized.

As may be appreciated from the foregoing, this invention provides an apparatus for covering selected portions of the exterior surface of a vehicle body which is quickly and easily installable on, or removable from, the vehicle body, readily adjustable to accommodate for any distortion of the shape or dimensions of the flexible covers which may occur over time due to usage, repeated application and removal thereof, and/or exposure to natural elements, and which closely conforms to contours of the covered portions of the vehicle body.

What is claimed is:

1. A covering unit for covering a selected portion of an exterior surface of a vehicle body, the vehicle body having front fenders and a bumper area, the selected portion including portions of the fenders and bumper the area and having at least a first contoured area located adjacent to the fenders and the bumper area and a lower edge, the contoured area and the lower edge each extending between first and second spaced lateral edges of the selected portion, the lateral edges formed in part by wheel well defining structures adjacent to the front fenders, the vehicle body also having a surface opposite to the exterior surface thereof, said covering unit comprising:

cover means configured to cover the selected portion of the exterior surface of the vehicle body, said cover means including engaging means associated therewith having a first section positionable along the first contoured area and a second section positioned adjacent to the lower edge of the selected portion when said cover means is positioned adjacent to the selected portion; and securing and conforming means engagable with said engaging means of said cover means for securing said cover means adjacent to the selected portion of the exterior surface of the vehicle body and maintaining said cover means in conformity with the first contoured area and edges thereof, said securing and conforming means engaging said second section of said engaging means of said cover means at an area adjacent to the surface of the vehicle body opposite to the exterior surface thereof when said cover means is secured adjacent to the selected portion.

2. The covering unit of claim 1 wherein said securing and conforming means includes a resilient cord and first and second retaining means, said retaining means being mountable to different ones of the wheel well defining structures, and said resilient cord being receivable in said first and second sections of said engaging means of said cover means and releasably securable to said retaining means.

3. The covering unit of claim 2 wherein said retaining means are s-shaped clips configured to be mountable to the wheel well defining structures without use of a tool.

4. The covering unit of claim 1 wherein said securing and conforming means is adjustable to thus provide for continued taut securement and conformity of said cover means on the selected portion of the exterior surface of the vehicle body.

5. The covering unit of claim 1 wherein said cover means includes first and second clip means attache thereto engagable with the vehicle body adjacent to the front fenders thereof and spaced from the wheel well defining structures.

6. The covering unit of claim 1 wherein said second section of said engaging means of said cover means includes a plurality of webbings attached to said cover means at spaced positions adjacent to the lower edge of the selected portion when said cover means is positioned adjacent to the selected portion, and wherein said first section of said engaging means of said cover means is a sleeve formed in said cover means.

7. The covering apparatus for covering a selected portion of an exterior surface of a vehicle body, the selected portion including at least a first part which is movable relative to other parts thereof with the first part having a forward edge and first and second spaced lateral edges, said covering apparatus comprising:
 a first cover section configured to cover the first part of the selected portion of the exterior surface of the vehicle body and including first and second resilient tensioning means each positionable between the first and second lateral edges of the first part for securing and conforming said first cover section on the first part, said first tensioning means being attachable to the first part and being at least partly located adjacent to the forward edge of the first part when said first cover section is positioned on the first part, and said second tensioning means being securable adjacent to the other parts of the vehicle body.

8. The covering apparatus of claim 7 wherein said first cover section includes front and rear edges, said front and rear edges having engaging means formed thereat for receipt therein of said first and second resilient tensioning means, respectively, said apparatus further comprising a second cover section configured to cover at least some of the other parts of the selected portion of the exterior surface of the vehicle body and including securing and conforming means for securing said second cover section on the other parts and maintaining said second cover section in conformity therewith, said second cover section having retaining means attached thereto adjacent to the first and second lateral edges of the first part of the selected portion of the exterior surface of the vehicle body for receiving and releasably retaining said second tensioning means of said first cover section thereat.

9. The covering apparatus of claim 8 wherein said first part is a portion of an exterior surface of a compartment hood, and wherein said first cover section includes a raised deflecting member at said rear edge of said cover portion, said deflecting member extending along substantially all of said rear edge of said first cover section from said first lateral edge to said second lateral edge of said first part.

10. The covering apparatus of claim 8 wherein said second resilient tensioning means includes at least one resilient cord, said resilient cord having adjustment means formable therein for adjusting the length of said cord, said first cover section having pockets formed therein for receipt of said adjusting means.

11. The covering apparatus of claim 8 wherein the other parts of the selected portion of the vehicle body include portions of front fenders and a bumper area of the vehicle body, and wherein said securing and conforming means comprises a length of resilient cord, said second cover section including a plurality of engaging means for receipt therethrough of said length of resilient cord, said resilient cord being engagable with the vehicle body at first and second positions to thus secure and conform said second cover section on the other parts.

12. The covering apparatus of claim 7 wherein the other parts of the selected portion of the exterior surface of the vehicle body include a portion of first and second movable headlamp housings, and wherein said covering apparatus further comprises third and fourth cover sections for covering the portions of the first and second movable headlamp housings, respectively.

13. A covering apparatus for at least partially covering selected portions of a body of a land vehicle, the vehicle including an undercarriage, and the body having a plurality of fixtures, therein, and exterior surface, and a lower edge, and an interior surface adjacent to the undercarriage, the lower edge including wheel well defining structures, the selected portions of the body including portions of a movable compartment hood, first and second fenders adjacent to different ones of the wheel well defining structures and the compartment hood, and a contoured part extending between the wheel well defining structures in a first direction and between the lower edge and the compartment hood in a second direction, said covering apparatus comprising:
 a first cover section having an edge portion and an outer surface and being configured to at least partially cover the contoured part and first and second fenders, said first cover section including engaging means connected thereto at said edge portion and first and second retaining clips connected to said outer surface at positions adjacent to the first and second fenders, respectively, when said first cover section is positioned thereon;
 resilient securing and conforming means engagable through said engaging means of said first cover section;
 first and second retaining means mountable at first and second positions adjacent to different ones of the wheel well defining structures for releasably receiving and securing said resilient securing and conforming means at said positions so that said engaging means of said first cover section are biased toward said interior surface of said body to thus secure and conform said first cover section at the lower edge of the vehicle body adjacent to the selected portions to be covered thereby without further attachment to the lower edge of the vehicle body; and
 a second cover section configured to at least partially cover the compartment hood and including first and second cover tensioning means for securing and conforming said second cover section on the compartment hood, said first tensioning means being releasably securable to the compartment hood and said second tensioning means having first and second ends receivable in different ones of said retaining clips of said first cover section.

14. The covering apparatus of claim 13 wherein the fixtures include first and second movable headlamp housings, wherein the selected portions of the body further include an upper surface structure of each of the housings, and wherein said apparatus further comprises third and fourth cover sections configured to at least partially cover the upper surface structure of the first and second movable headlamp housings, respectively.

15. The covering apparatus of claim 11 wherein the upper surface structures of the first and second headlamp housings each include a lip at one edge thereof, and wherein said third and fourth cover sections each include clip means attached thereto, each being receivable over a different one of the lips of the upper surface structures of the headlamp housings.

16. The covering apparatus of claim 13 wherein said second cover section includes a raised deflecting member having said second tensioning means maintained therethrough.

17. The covering apparatus of claim 13 wherein said second tensioning means of said second cover section includes at least one resilient cord, said second cover section having a forward edge and a rearward edge with said resilient cord being adjustably mounted at said rearward edge of said second cover section.

18. The covering apparatus of claim 13 wherein the contoured part includes a front bumper having a lower edge corresponding in part to the lower edge of the vehicle body, said edge portion of said first cover section being adjacent to the lower edge of the bumper when said first cover section is positioned on the vehicle body, and wherein said first cover section includes second engaging means associated therewith positionable at the contoured part and extending in the first direction adjacent to the bumper when said first cover section is positioned thereon, said second engaging means receiving said resilient securing and conforming means therethrough so that said first cover section is maintained in conformity with the contoured part when said first cover section is secured.

19. The covering apparatus of claim 18 wherein said resilient securing and conforming means is a length of resilient cord joined at ends thereof.

20. A covering unit for covering a selected portion of a movable headlamp housing located in a vehicle body, said housing including an upper surface structure having a lip, at least a part of said upper surface structure being substantially coplanar with an exterior surface of the vehicle body when said housing is in a first position, said covering unit comprising:
   a cover configured to cover the selected portion of the housing, said cover including an edge portion;
   clip means attached to said edge portion of said cover and engagable with the lip of the upper surface structure of the headlamp housing for releasable securement of said cover thereat; and
   securing means for releasably securing said cover to the housing at at least one position other than the lip thereof.

21. The covering unit of claim 20 wherein said clip means includes an elongated trough, the lip being receivable in said trough of said clip.

22. The covering unit of claim 20 wherein said cover is configured to cover substantially all of the upper surface of the housing, wherein said clip means includes structure for receiving the lip therein, and wherein said securing means includes a first fastener for fastening said cover to said housing adjacent to an edge of said cover spaced from said edge portion.

23. The covering unit of claim 22 wherein said edge and said edge portion of said cover define front and rear edges, respectively, of said cover, said cover including first and second side edges, said securing means also including second and third fasteners for fastening said cover to said housing adjacent to said side edges.

* * * * *

UNITED STATES PATENT AND TRADEMARK OFFICE
CERTIFICATE OF CORRECTION

PATENT NO. : 4,997,229
DATED : March 5, 1991
INVENTOR(S) : Swanson

It is certified that error appears in the above-identified patent and that said Letters Patent is hereby corrected as shown below:

Column 4, line 68, "cove" should be --cover--.

Column 8, line 16, before "bumper" insert --the--.

Column 8, line 17, delete "the".

Column 8, line 63, "attache" should be --attached--.

Column 10, line 11, after "fixtures" delete ",".

Column 10, line 11, "and" should be --an--.

Signed and Sealed this

Fourth Day of August, 1992

Attest:

DOUGLAS B. COMER

*Attesting Officer*  *Acting Commissioner of Patents and Trademarks*